United States Patent [19]
Santana

[11] 3,848,489
[45] Nov. 19, 1974

[54] ROTARY MACHINE TOOL

[76] Inventor: Augustin Zabaleta Santana, Prim 43, Bilbao, Spain

[22] Filed: Mar. 9, 1973

[21] Appl. No.: 339,647

[52] U.S. Cl. .................................. 82/61, 32/70.2
[51] Int. Cl. ........................ B23b 3/04, B23b 5/14
[58] Field of Search ............. 82/61, 62, 63, 64, 65, 82/70.2, 71, 72, 73, 74, 75, 76, 77

[56] References Cited
UNITED STATES PATENTS

| | | | |
|---|---|---|---|
| 857,284 | 6/1907 | Huber | 82/61 |
| 1,160,387 | 11/1915 | Curtis | 82/61 |
| 2,057,011 | 10/1936 | Corwin | 82/61 |
| 2,112,396 | 3/1938 | Corrigan | 82/63 |
| 3,379,080 | 4/1968 | Massa | 82/61 |

Primary Examiner—Harrison L. Hinson

[57] ABSTRACT

A rotary machine tool includes a pair of axially aligned rotatable wheels. One of the wheels has radially extending guide slots, and the other of the wheels has generally spiral shaped guide slots. Means, such as pinion gear means coupled to gear teeth on the perimeters of the wheels, are provided for producing relative rotary displacement of the wheels. A tool carrier is slidably mounted with respect to one of the wheels, and carries a pin engaging the slots of the two wheels, so that the tool carrier is radially displaced upon relative rotation of the wheels.

12 Claims, 4 Drawing Figures

ROTARY MACHINE TOOL

The present invention concerns machining apparatus especially suitable for cutting and/or bevelling pipes, and apparatus which, by being provided with displaceable cutting tools, is capable of, for example, cutting through pipes of different material, usually metal, and of effecting this operation without needing the application of manual effort.

Although the apparatus lends itself to the connection of mechanisms, devices or tools ancillary to the machine or cutting tool art, the present invention is specifically described with reference to a cutting and bevelling head without specific mention of any of the numerous forms the other members forming the apparatus may adopt.

It is an object of the invention to provide a mechanically simple, lightweight machine which can be readily handled and transported and is inexpensive to operate and maintain.

According to the present invention, a machining apparatus comprises at least one slidable tool carrier, two rotatable wheels and means for producing rotary displacement of one wheel relative to the other. One or more grooves or slots are formed in each of said wheels, with the grooves or slots of one wheel being radial and the grooves or slots of the other wheel each subtending an angle at the center of said other wheel and having one end closer to the center of said wheel than the other end. The carrier has means extending into said grooves or slots. The slots may be straight or curved, and lead to the center of rotation whereby the tool-carrying slide moves radially as it rotates, and the tool is able to cut the pipes.

The tools are arranged in intersecting planes in order to avoid scraping against the cutting surface.

The invention will be described further, by way of example, with reference to the accompanying drawings, in which.

Figure 2:
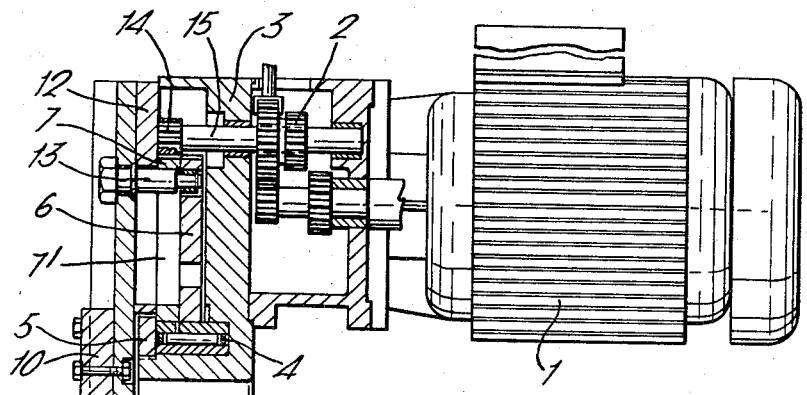
FIG. 2 is a section on the line A—A of the cutting head of FIG. 1.
Figure 3:
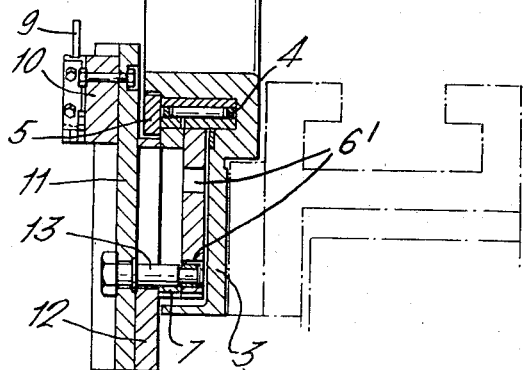
FIG. 3 is a plan view of one toothed driving wheel showing guide slots and threaded openings for the locating studs of the guides of tool carrying slides.
Figure 3:
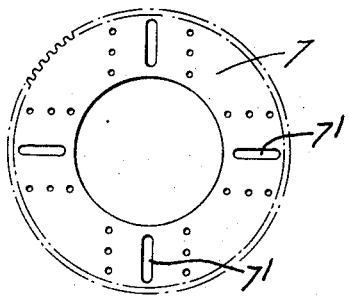
Figure 4:
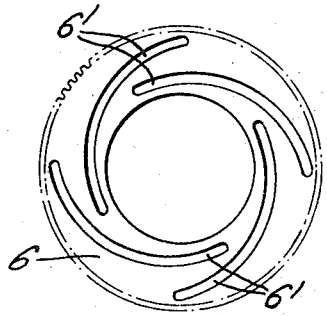
FIG. 4 is a plan view of another toothed driving wheel showing helical guide grooves.

The pipe cutting apparatus includes an electric motor 1 for actuating the cutting head. The motor is mounted on the body 3 of the apparatus by means of any suitable construction. A speed changer 2 is directly coupled to the motor driving shaft which although it may be of any known kind is shown in FIG. 2 as a changer having two speeds and actuable by a conventional lever and fork guide. The speed changer is mounted on the body 3 (or it may be mounted on a part secured to the cutting head).

The circular body 3 has a center opening, the diameter of which determines the maximum diameter of pipes that may be cut by the head. A needle bearing 4, is mounted around the center opening. The inner ring race of bearing 4 is secured to the body 3 and its outer ring race is rotatable and is composed of two independent rings. Control of the roller bearing action is obtained by means of a fixing washer or nut 5 threaded onto the body 3.

Two externally toothed wheels 6 and 7 located outside of separate parts forming the outer race 4 are mounted as follows: the toothed wheel 6 is mounted first and has four guide slots 6' of suitable length formed as part spirals although they may have any other shape. The slots are uniformly spaced in the surface of the wheel. The toothed wheel 7 is mounted next and is provided with four straight, radial guide slots 7' which are uniformly distributed and of suitable length. The type of slots provided in the wheels 6 and 7 may be reversed, and the slots in at least one of the wheels may be grooves. The teeth of both wheels, although of the same type are of different design. This condition is very important as will become apparent in the description of the operation of the apparatus.

Four guides 12 for tool carrying slides 11 are secured on the toothed wheel 7 and each of these guides is provided with a groove coinciding with the radial slots of the toothed wheel 7.

Cutting and bevelling tools are formed by cutters or tools 9 which may be located in intersecting planes. The tools 9 are mounted in carrier 10 anchored in the respective slides 11. The slides 11 have a dove-tail fitting in the guide rails 12 screwed to the toothed wheel 7. The dove-tail fitting has sufficient play to permit displacement of the tool carrier 10 along the guide rails. In order to enable displacement between positions of maximum and minimum opening bolts 13 are held in slides 11 at one end by means of a nut and bolt, in their center part they slidably pass through the straight grooves 7' of the guides 12 and toothed wheels 7; at their opposite ends they are provided with pipe fittings or sockets adapted to roll in the curved slots of the inner wheel 6.

Figure 1:
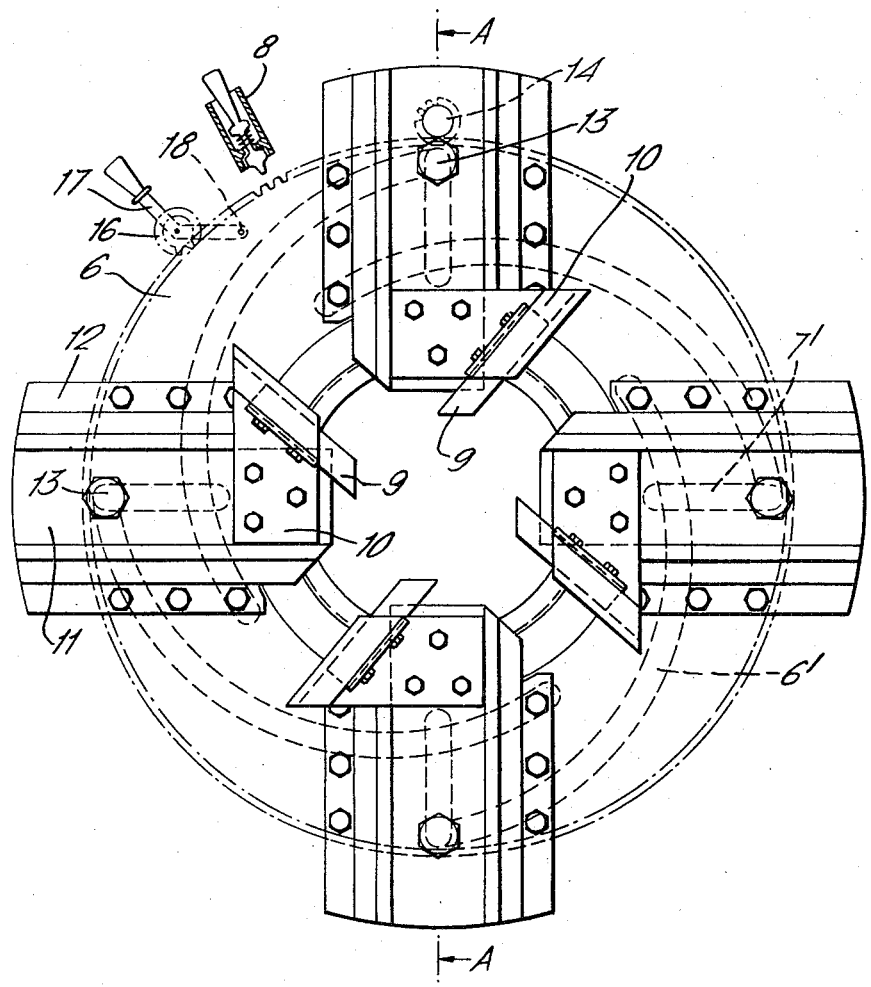
FIG. 1 is a plan view of a cutting head in accordance with the invention, with the body and members for transmitting movement being omitted to enable the details of the cutting head to be more clearly seen.

A shaft 15 is connected to the outlet of the speed changer 2 and has a pinion 14 fitted thereon which engages the external teeth of the toothed wheel 7 having straight grooves 7'. A shaft is supported on the body 3 or fixed part of the head by conventional means (not shown) and has two pinions 16 fitted thereon which are engageable with separate ones of the toothed driving wheels 6 and 7. Only one of the pinions appears in FIG. 1, the other pinion being coaxial with the pinion that is shown.

The apparatus operates as follows. The drive of the electric motor 1 is transmitted to the pinion 14 by way of the speed reducer 2. Pinion 14 engages in the toothed driving wheel 7 which begins to rotate about its axis and in this manner all the parts secured thereto begin to rotate so as to cause the tool carriers 11 to turn. This movement compels the cutting tools 9 to move around the axis for rotating the assembly. The movement of the toothed wheel 7 having the straight grooves 7', is transmitted to the pinions 16 with the result that the pinion 16 engaging the toothed wheel 6, having curved grooves, causes rotation of said wheel 6. Pinions 16 are of different pitch size and, consequently, the gear ratio of the wheels is different, these wheels do not rotate at the same speed and therefore de-phasing occurs between the original positions in such manner that the trajectories determined by the crossing points between the straight grooves of the wheel 7 and the (secant type) curved grooves (which may, however, be straight) of the wheel 6, result in a relative movement of the bolts 13 which is in a straight radial line relative to the displaceable parts and in a spiral relative to the stationary parts, this also being the movement of the cutters.

The two pinions 16 are mounted in a support 17 linked at 18 to the body 3. This support 17 is provided with a suitable holder (grip) and may be pivoted about the point 18, so that the pinions 10 can be thus manually engaged in or disengaged from the wheels 6 and 7 and in this manner to prevent the radial advance of the cutters 9 if desired. The support 17 is displaced until the pinions 16 are out of contact with the wheels 6 and 7, at which time these wheels will rotate jointly due to the inner friction of the machine and without their being relatively de-phased or a radial advance of the tools occurring.

The apparatus is also provided with a manually operated locking mechanism (pawl) 8 which may be inserted between the teeth of the wheel 6. When the motor is stopped and the pinion 16 is out of contact with the wheel 6 and 7, it is possible to operate this locking mechanism, thus locking the wheel 6, and by imparting a slight manual rotation to the assembly of the wheel 7, guides 12 and slides 11, a rapid radial displacement of the tools is produced (inwardly or outwardly according to the direction of rotation).

A pipe cutting operation is effected as follows. A pipe is introduced into the center opening in the head until it occupies the correct cutting position. Once the pipe is secured to the body of the machine, it is possible to effect the manual approach of the tools as desired, and as described in the preceding paragraphs. Once the locking mechanism 8 is released and the pinions 16 are engaged in the toothed wheels 6 and 7, the motor 1 is started and the tools begin their spiral displacement producing cuttings from the pipe; the radial speed of the tools may be adjusted by way of the reducer 2 and the depth of cut or pitch of the spiral is a function of the number of teeth of the two pinions 16 which are formed in one piece. By replacing these (i.e. the pinions) with others suitable for the purpose, it is possible to control the depth of the said cut.

It must be stated that the machine works most evenly with the use of four tools arranged in a uniform radial distribution. Two opposed tools may be cutting blades situated on intersecting planes and the other two opposite tools are bevelling blades; each of these latter blades being located on each of the surfaces of the pipe produced by the cut. The apparatus may, however, also work with one, two or three identical or different tools.

Now that the nature and construction of the present invention has been sufficiently described, it only remains to add that it is possible to introduce changes of shape, material and arrangement as a whole or in separate parts provided that these modifications come within the scope of the present invention.

What is claimed is:

1. A machine apparatus comprising a tool carrier, first and second axially aligned wheels having a common axis, at least one guide slot in each said wheel, the slot in one of said wheels extending radially and the slot in the other said wheel subtending an angle at the center of said other wheel and having one end closer to said center than the other end thereof, means for rotatably mounting said wheels, a pair of coaxial pinion gears separately engaging said first and second wheels and having different diameters for producing relative rotary displacement between said first and second wheels, means slidably mounting said tool carrier with respect to one of said wheels, means coupled to said carrier and engaging the slots in said first and second wheels for displacing said carrier in response to relative rotation of said wheels, and means for selectively holding one of said wheels at a fixed angular position.

2. The apparatus of claim 1 comprising means for selectively disengaging at least one of said pinions from the respective wheel.

3. The apparatus of claim 2 wherein said means for selectively disengaging said pinion comprises means for radially displacing said pinion with respect to the corresponding said wheels.

4. The apparatus of claim 1 in which said wheels have external gear teeth, and in which said means for holding one of said wheels comprises pawl means mounted for selective movement between the teeth of the corresponding wheel, container means mounted in a fixed position for containing said pawl, and spring means for resiliently biasing said pawl away from said teeth.

5. The apparatus of claim 1 wherein said tool carrier comprises a plurality of tool carrying means, and tools mounted in said tool carrying means, said tools being adapted for different machine operations.

6. The apparatus of claim 1 wherein said means coupled to said carrier comprises bolt means extending with a clearance through the slots of said first and second wheels, and means affixing said bolt to said tool carrier.

7. A machine apparatus comprising a tool carrier, first and second axially aligned wheels having a common axis, at least one guide slot in each said wheel, the slot in one of said wheels extending radially and the slot in the other said wheel subtending an angle at the center of said other wheel and having one end closer to the center than the other end thereof, means for rotatably mounting said wheels, a pair of coaxial pinion gears separately engaging said first and second wheels and having different diameters for producing relative rotary displacement between said first and second wheels, means slidably mounting said tool carrier with respect to one of said wheels, bolt means extending loosely through the slots of said first and second wheels, and means affixing said bolt to said tool carrier, whereby relative motion between said wheels displaces said bolt means and said affixed carrier.

8. The apparatus of claim 7 comprising means for selectively disengaging at least one of said pinions from the respective wheels.

9. The apparatus of claim 8 wherein said means for selectively disengaging said pinion comprises means for radially displacing said pinion with respect to the corresponding said wheels.

10. The apparatus of claim 7, further comprising means for selectively holding one of said wheels at a fixed angular position.

11. The apparatus of claim 10 in which said wheels have external gear teeth, and in which said means for holding one of said wheels comprises pawl means mounted for selective movement between the teeth of the corresponding wheel, container means mounted in a fixed position for containing said pawl, and spring means for resiliently biasing said pawl away from said teeth.

12. A machine apparatus comprising a tool carrier, first and second axially aligned wheels provided with external teeth and having a common axis, at least one guide slot in each said wheel, the slot in one of said wheels extending radially and the slot in the other said wheel subtending an angle at the center of said other wheel and having one end closer to said center than the other end thereof, means for rotatably mounting said wheels, a pair of coaxial pinion gears separately engaging said first and second wheels and having different diameters for producing relative rotary displacement between said first and second wheels, means for radially displacing said pinion gears with respect to the corresponding said wheels to a position where the pinion gears are disengaged from said wheels, means slidably mounting said tool carrier with respect to one of said wheels and means coupled to said carrier and engaging the slots in said first and second wheels for displacing said carrier upon the relative rotation of said wheels.

* * * * *